United States Patent [19]

Vives

[11] Patent Number: 4,521,642

[45] Date of Patent: Jun. 4, 1985

[54] SEALED CONNECTION CONNECTING AN UNDERSEA COAXIAL CABLE TO A REPEATER AND A METHOD OF MAKING SAME

[75] Inventor: Jean-Patrick Vives, Calais, France

[73] Assignee: Les Cables de Lyon, Lyons, France

[21] Appl. No.: 270,197

[22] Filed: Jun. 3, 1981

[30] Foreign Application Priority Data

Jun. 5, 1980 [FR] France ............................... 80 12501

[51] Int. Cl.³ .............................................. H02G 15/14
[52] U.S. Cl. ................................... 174/70 S; 156/49;
 174/88 C; 249/95
[58] Field of Search ............... 174/70 S, 88 C; 156/49

[56] References Cited

U.S. PATENT DOCUMENTS

| | | | |
|---|---|---|---|
| 2,782,249 | 2/1957 | Martin | 174/70 S |
| 4,245,134 | 1/1981 | Oldham et al. | 174/70 S |
| 4,259,543 | 3/1981 | Oldham | 174/70 S |
| 4,313,027 | 1/1982 | Vives | 174/70 S |

FOREIGN PATENT DOCUMENTS

| | | | |
|---|---|---|---|
| 1280439 | 7/1972 | United Kingdom | 174/70 S |
| 2015922 | 9/1979 | United Kingdom | |

OTHER PUBLICATIONS (S9003 0023), Morse, G. E. et al., "Cable and Coupling Design", *The Bell System Technical Journal*, vol. 57, No. 7, Sep. 1978, pp. 2435–2469.

*Primary Examiner*—Laramie E. Askin
*Attorney, Agent, or Firm*—Sughrue, Mion, Zinn, Macpeak & Seas

[57] ABSTRACT

A sealed connection between an undersea coaxial line cable and a length of coaxial access cable connected to a repeater; the line cable comprising an axial conductor (11), insulation (12), a return path (13) and an outer sheath (14A); the access cable comprising an axial conductor (15), insulation, metal braiding (20A, B) forming a return path, and an outer sheath (14B); and the connection comprising a conical conductive metal connection part (16) for inter-connecting the axial conductors, a surface moulded layer of insulating thermoplastic material (17), a conductive connector (18) for interconnecting the return paths of the line cable and the access cable, and a reconstituted sheathing between the line cable and the access cable, wherein said conductive connector for inter-connecting the return paths comprises an aluminum flared tube fitted tightly over the surface-moulded insulation, with a layer of graft polyolefin or adhesive ionomer tape wound helically around the surface moulding being sandwiched in between the moulding and the flared tube, the wider end of the flared tube having a flared rim (19) receiving and being welded to the return path of the line cable, and the narrower end of the flared tube being glued with conductive adhesive to the metal braiding (20A) of the access cable.

4 Claims, 6 Drawing Figures

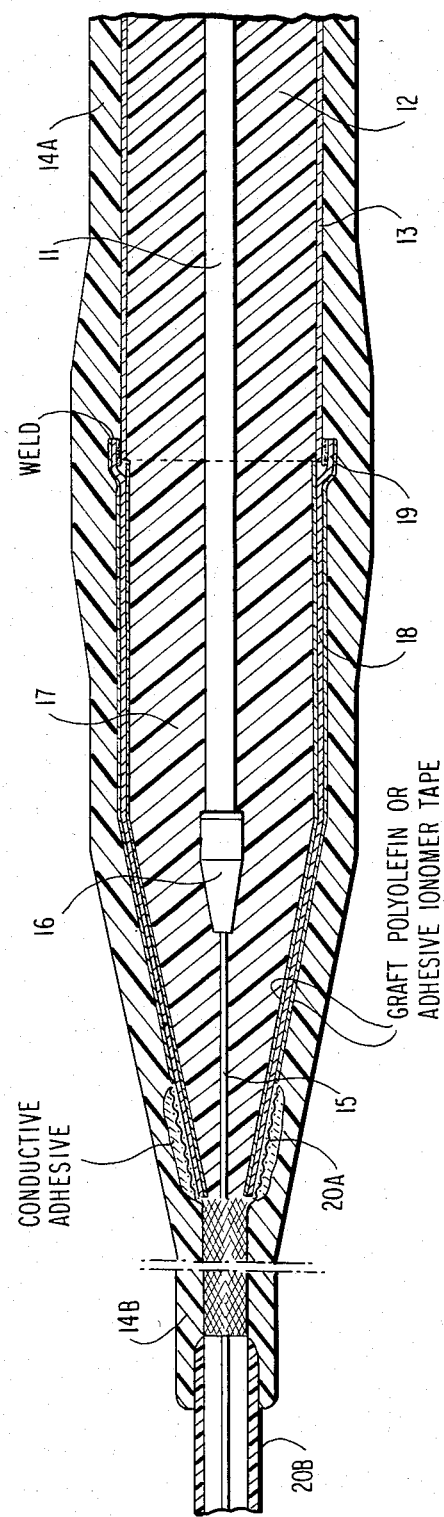

SEALED CONNECTION CONNECTING AN UNDERSEA COAXIAL CABLE TO A REPEATER AND A METHOD OF MAKING SAME

The present invention relates to a sealed connection between an undersea coaxial line cable and a length of coaxial access cable connected to a repeater; the line cable comprising an axial conductor, insulation, a return path and an outer sheath; the access cable comprising an axial conductor, insulation, metal braiding forming a return path, and an outer sheath; and the connection comprising a conical conductive metal connection part for inter-connecting the axial conductors, a surface-moulded layer of insulating thermoplastic material, conductive connection means for interconnecting the return paths of the line cable and the access cable, and means for reconstituting the sheathing between the line cable and the access cable. It also relates to a method of manufacturing such a connection and to a mould suitable for use in the method.

BACKGROUND OF THE INVENTION

Under-sea cables used for transmitting a large number of telephone channels are generally of the coaxial type and include a plurality of remote-fed amplifiers or "repeaters" placed at regular intervals in series in the cable to compensate for the attenuation of the signals therealong over the entire frequency band width used.

During the past few years cables of the "central strength member" type have been laid and have generally included a central conductor formed by steel strands contained in a copper tube formed by longitudinally welding a tape which has been rolled around the strands, with an insulator constituted by polyethylene extruded over the central conductor, and a return path formed by an aluminium strip that may optionally be laminated on one or both surfaces. Said aluminium strip is applied longitudinally over the insulator with its edges overlapping and a polyethylene sheath is extruded over the return path.

When laid in shallow water such cables have also had external armouring formed by one or more layers of steel wire helically wound around the cable.

Repeaters for connection to the cable have been fitted with a length of access cable at each end, said access cable being formed by a coaxial cable of smaller diameter than the line cable, with a copper central conductor and a copper braiding outer conductor which are insulated from each other by a concentric polyethylene layer. The method used up till now entails:

(a) interconnecting the central conductor of the line cable to the central conductor of the access cable. Said connection is made by brazing the central conductors to respective ends of a conical copper connection part, and is performed after a conductive sleeve part has been positioned over the insulation of the access cable. Said sleeve part is formed by a cylindrical aluminium body extended on either end by castellated tubes of decreasing length. The tube situated on the end nearest to the access cable is itself constituted by a copper portion welded to the aluminium portion which is integral with the cylindrical body and which has previously been surface treated with oxygen to facilitate subsequent adherence of a polyethylene layer which is surface moulded on these parts;

(b) surface moulding with polyethylene to reconstitute the insulation of the line cable and to seal it to the tube for access to the cylindrical body;

(c) welding the braiding of the access cable on the copper end of the tube for access to the cylindrical sleeve and surface moulding of a polyethylene sheath on the connection between the braiding and the tube;

(d) installing a cylindrical aluminium sleeve over the surface moulding of the insulator on the side nearest the line cable and spot welding this sleeve on one side to the return of the line cable and on the other side to the outer surface of the cylindrical body, this operation being followed by reconstitution of the outer sheath of the cable, and (e) installing a protective neoprene nipple filled with polyisobutylene on the connection between the cable for access to the repeater and the tube, as described in U.S. Pat. No. 2,782,249 in the name of Paul Martin.

This method is very complex and very expensive; the connection obtained also had the serious drawback of creating a discontinuity in the characteristic impedance between the line cable and the access cable at the cylindrical sleeve body, which has the effect of reflecting echoes which are detrimental to proper high frequency transmission of the signals along the line.

A simpler solution has been proposed in U.S. Pat. No. 4,245,134 by International Standard Electric Co. In this solution, polyethylene is surface moulded in a frusto-conical configuration to reconstitute the insulation between the line cable and the access cable. A set of tubular parts in the form of cylinders and then in the form of truncated cones are welded to one another to provide electrical connection between the aluminium return path of the line cable and the copper braiding of the access cable. However, in order to link the aluminium conductor to the copper braiding, a zinc intermediate part must be used to prevent corrosion due to the difference in potential between the metals, and further, the welds are made over the polyethylene insulator in a zone where it is particularly thin and can therefore cause damage to the insulator. Lastly, although it is simpler than the previously described method, this method nevertheless requires a great number of operations.

Preferred implementations of the present invention simplify the operations necessary to make the connection while providing good continuity of impedance along the whole connection.

In the connection according to the invention, the conductive connection means for inter-connecting the return paths comprises an aluminium flared tube fitted tightly over the surface moulded insulation, with a layer of graft polyolefin or adhesive ionomer tape wound helically around the surface moulding being sandwiched in between the moulding and the flared tube, the wider end of the flared tube having a flared rim receiving and being welded to the return path of the line cable, and the narrower end of the flared tube being glued with conductive adhesive to the metal braiding of the access cable.

It also has preferably at least one of the following features:

The means for reconstituting the sheathing between the sheaths of the line cable and the access cable are constituted by a surface moulding made of thermoplastic material which is injected hot.

The means for reconstituting the sheathing between the sheaths of the line cable and the access cable include a surface moulding of thermoplastic material injected hot and extending from the outer sheath of the line cable to the vicinity of the conical portion of the flared tube, said surface moulding ending in a splined portion fitted with an elastomer nipple filled with polyisobutylene.

The outer conductor of the access cable is surrounded by an elastomer sleeve which is connected to said elastomer nipple.

In the method of manufacturing a sealed connection
(a) the insulation of the line cable and that of the access cable are removed from the zone required for connection by cutting them obliquely;
(b) the end of the metal braiding which forms the return path of the access cable is rolled towards the repeater;
(c) the axial conductor of the access cable is brazed to the small end of the conical conductive metal connection part and the axial conductor of the line cable is brazed to the large end of the conical conductive metal connection part,
(d) a layer of insulating thermoplastic material is surface-moulded over the conical connection part and extends between the insulation of the access cable and of the line cable;
(e) at least one graft polyolefin or adhesive ionomer tape is helically wound around said layer of insulating thermoplastic material;
(f) a conductive aluminium flared tube having a flared rim at its larger end is fitted over said layer which is surrounded by said tape;
(g) said flared rim is welded onto the end of the return path of the line cable;
(h) the end of the metal braiding which forms the return path of the access cable is turned down over the smaller end of the flared tube and is glued thereon with a conductive adhesive; and
(i) a sheath is surface-moulded over at least the end of said flared tube nearest the line cable, said surface moulding being performed at a sufficiently high temperature to melt the graft polyolefin or adhesive ionomer tape, the connection between said sheath and the sheath of the access cable thereby being completed.

It further has preferably at least one of the following features:

The sheath of the line cable is connected to the sheath of the access cable entirely by surface moulding.

The end of the flared tube nearest to the line cable is covered by surface moulding, imparting a splined configuration to the end of surface moulding, and an elastomer connection nipple is fitted on the end of the sheath of the access cable on said splined end.

The end of the return path of the access cable is surrounded with an elastomer sleeve and the corresponding end of said nipple is fitted onto the end of said sleeve.

The mould which is suitable for use in the method of surface moulding over the conical connection part and between the insulation of the access cable and the line cable has two half shells each of which has an inner part made of metal which is a good conductor of heat and a steel outer part, or else is entirely made of a metal which is a good conductor of heat and has at least one orifice for injecting thermoplastic material into the smallest diameter zone at the end nearest the access cable.

It further has preferably at least one of the following features:

It includes two insertion ducts in the cavity of the mould, said ducts being disposed symmetrically relative to the flash line of the two half shells and communicating with the injection orifice.

It includes grooves in the half shells on either side of the moulding cavity, the depth and width of these grooves being sufficient to reduce considerably the transmission of heat to the insulation of the access cable and of the line cable, said grooves being located both in the inner parts made of said metal which is a good conductor of heat and in the outer parts.

It includes means for maintaining the inner conductor of the access cable under mechanical tension during moulding.

Said means include a clamp to grip the access cable, a ring which forms a stop and a spring housed in a bore of a part disposed in the end of the inner duct of the mould.

A sealed connection in accordance with the invention and a method of making it are described hereinafter by way of example and with reference to the figures of the accompanying drawings.

DESCRIPTION OF PREFERRED EMBODIMENT

Figure 1:
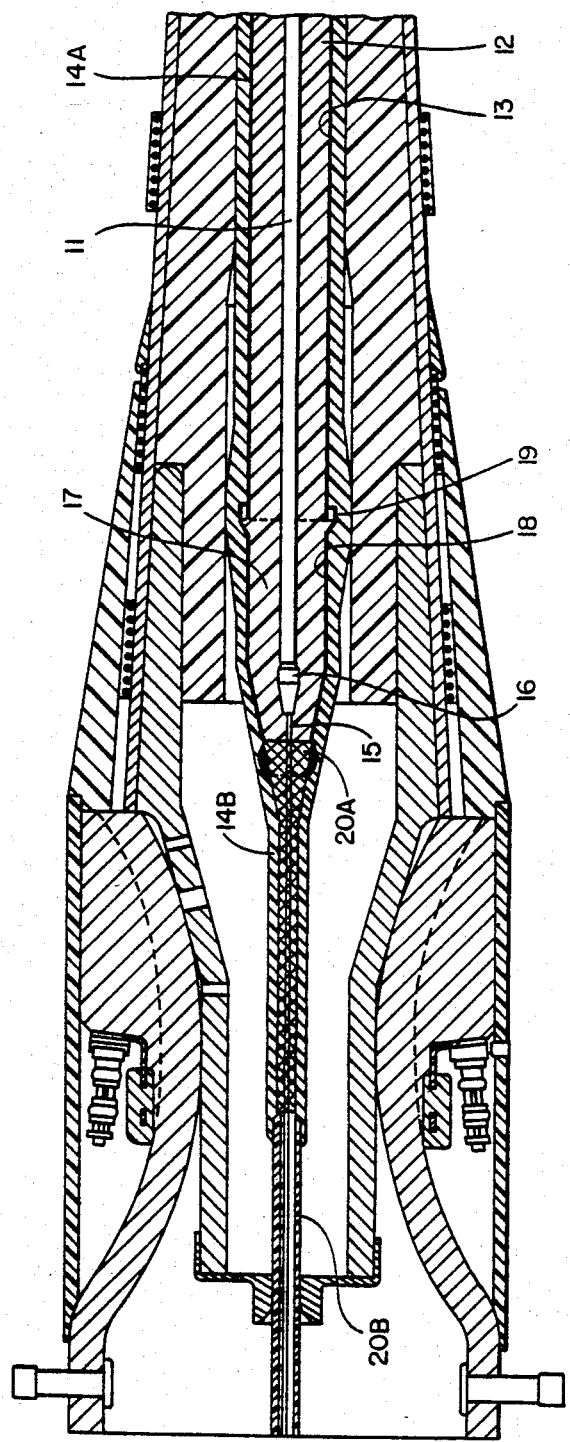
FIG. 1 is an axial cross-section of the connection.
Figure 1B:
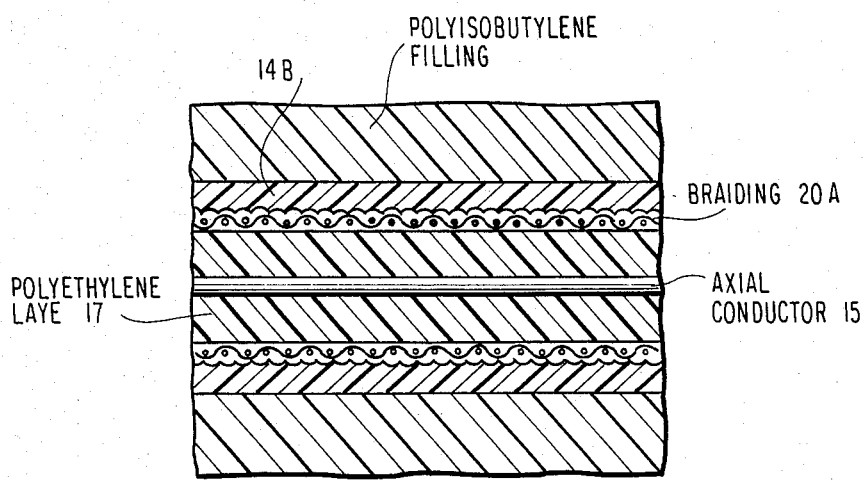
FIG. 1A is an enlarged axial cross-section of a part of the connection shown in FIG. 1.

In FIG. 1, the axial conductor 11 of a coaxial undersea line cable is surrounded by insulation 12 which is disposed between the axial conductor 11 and an outer return path 13 formed by a longitudinal aluminium tape folded so that its edges overlap. A polyethylene sheath 14A protects the return path.

The axial conductor 11 of the line cable and the axial conductor 15 of a length of coaxial access cable connected to a repeater are connected together by brazing them to either end of a conical copper connection part 16 whose pointed end points towards the access cable.

To do this, the insulation 12 of the line cable and that of the access cable are cut slightly obliquely and a few centimeters thereof are removed on either side of the connection point. This is done after the braiding which covers the access cable has been slid back as far as possible from the end of the cable.

Then a layer 17 of polyethylene is surface-moulded over this connection, the diameter of said layer decreasing from that of the line cable insulation to that of the access cable insulation, so as to re-establish continuity and sealing between both sizes of insulation.

There are no sudden variations in the slope of the profile of this surface-moulded layer and this maintains good local uniformity in impedance defined by the equation $$Z_x = \frac{60}{\sqrt{\epsilon}} \log_e \frac{D_x}{d_x}$$

where $D_x$ is the outside diameter of the insulation, $d_x$ is its inside diameter at the abscissa point x, and $\epsilon$ is the permittivity of the dielectric i.e. close to 2.3 for polyethylene. The mould used for this surface moulding is described hereinafter with reference to FIGS. 2 and 3.

Then, an aluminium flared tube 18 is fitted over the surface-moulded polyethylene so as to fit closely to the surface moulding. This is done after a layer of thin tapes made of graft polyethylene or adhesive ionomer (such as that marketed under the trade mark "Surlyn") is interposed between the inner surface of the flared tube and the outer surface of the polyethylene. "Surlyn" tapes are also wound onto the outer surface of the flared tube.

The flared tube 18 has a flared rim 19 which fits over the end of the return path 13 and is then welded thereto by a few spot welds using the method referred to as "Aircospot" welding.

The end of braiding 20A is then turned down over the small-diameter end of the flared tube. The braiding is then glued onto the flared tube by means of a conductive adhesive based on epoxy resin containing a conductive substance, e.g. beads of silver-coated glass, then the outer sheath of the cable is reconstituted over the return path, the flared tube and the braiding up to sheath 20B of the access cable. The surface-moulded coating for reconstituting the outer sheath is obtained by injecting polyethylene by means of a mould analogous to that used for surface-moulding around the inner conductors. In a variant, sheath moulding is stopped half way up the conical portion and the surface-moulding is arranged to have external splines in which neoprene studs filled with polyisobutylene are fixed (U.S. Pat. No. 2,782,249). The non-sheathed portion of the access cable is reinforced by a neoprene elastomer sleeve which should be made fast to the studs. The heat given off by this sheath-reconstituting surface moulding operation is sufficient to melt the "Surlyn" tapes which coat the polyethylene cone and those tapes which are wound around the outside on the aluminium flared tube so that a sealed connection is established between the aluminium of the flared tube and the polyethylene layers adjacent thereto.

The external components which provide the mechanical connection are analogous to those described in U.S. Pat. No. 4,313,027 by the Applicant and are not described again here.

Figure 2:
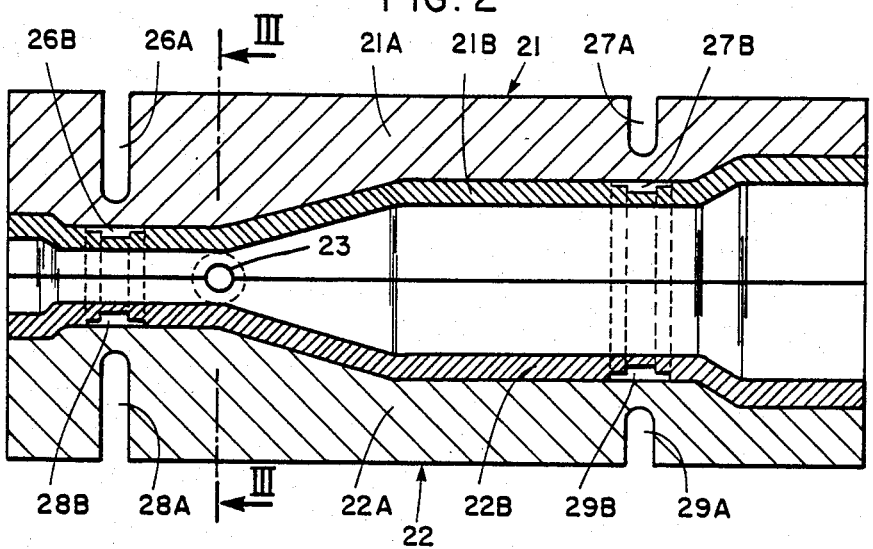
FIG. 2 is an axial cross-section of a mould for surface moulding to reconstitute the insulation between the line cable and the access cable.
Figure 3:
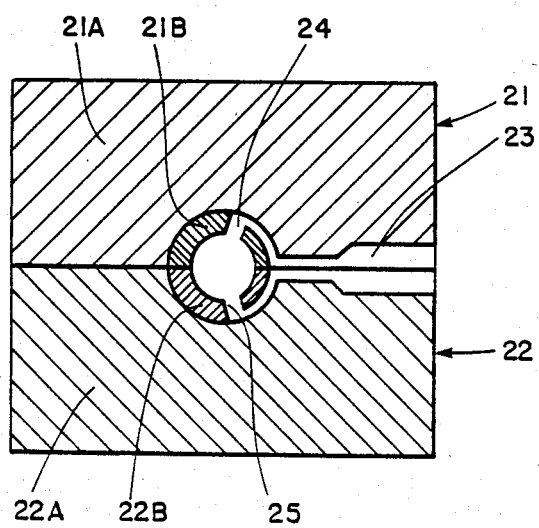
FIG. 3 is a transversal cross-section in plane III—III of FIG. 2.

The mould used to reconstitute the insulation between the line cable and the access cable is illustrated in FIGS. 2 and 3.

FIG. 2 is a lengthwise cross-section of the mould and FIG. 3 is a cross-section in plane axis III—III of FIG. 2, the mould having two half shells 21 and 22 each of which is formed by two concentric portions 21A and 21B, and 22A and 22B, the centremost portion being made of aluminium and the outer portion being made of steel. As aluminium has a higher coefficient of expansion than steel, this arrangement provides excellent thermal contact between the two parts of each half-mould at the temperature at which the polyethylene is injected but also allows easy separation of these two parts to dismantle the mould when its parts return to ambient temperature. The mould can alternatively be made entirely of aluminium.

Further, to fill the space between the mould and the cable to be covered more completely, the material is injected through an orifice 23 into the mould via the end of smallest diameter, i.e. the end which corresponds to the end of the access cable. Thus, heat from the molten polyethylene is given off at the point where the moulded material is thinnest and therefore has the greatest tendency to cool down prematurely. The orifice 23 is located on the flash line between the two half-moulds and the material to be injected flows along two symmetrical passages 24 and 25, thus driving out the residual air contained in the mould via the flash line where it finds an easier leakage path and thus prevents bubbles from forming at the periphery of the mould.

Lastly, each steel half mould has deep grooves 26A, 27A, 28A and 29A situated on either side of the zone to be moulded and designed to thermally insulate this zone from the portions of the line cable and the access cable which need to be prevented from melting accidentally under the effect of the heat given off by the mould, while aluminium half-moulds have analogous grooves 26B to 29B which are not necessarily aligned with the grooves of the steel half moulds. This provides cheap optimization of the temperature transition at the walls of the moulding.

Figure 4:
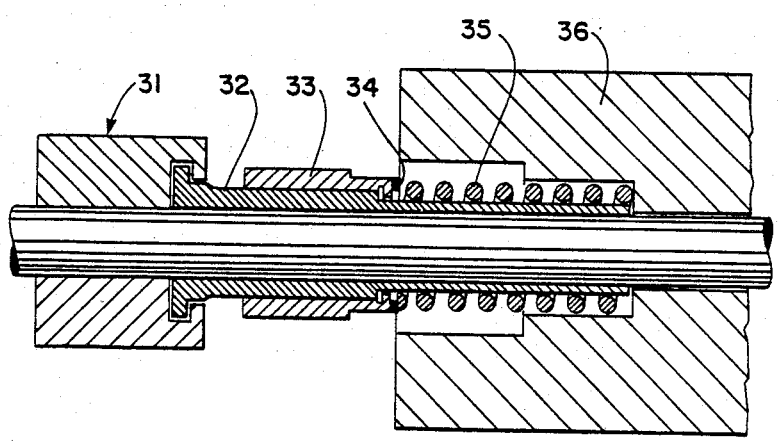
FIG. 4 is an axial cross-section of a device for keeping the axial conductor of the access cable under mechanical tension during the surface moulding operation.
Figure 5:
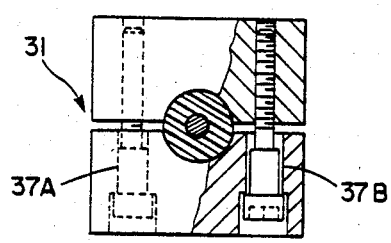
FIG. 5 is a partially cut away transversal cross-section in elevation of the same device.

The quality of insulation moulding over the join in the inner conductor between the line cable end the access cable is considerably improved by maintaining the access cable under mechanical tension during moulding by means of a device illustrated in FIGS. 4 and 5. This device is positioned in the flared portion of the central passage situated on the extreme left-hand side of FIG. 2 and includes a clamp 31 made of two halves which grip the outside of the access cable on the sheath or on the braiding or on the insulator. A guide part 32 and an outer sleeve 33 act as a stop, and a ring 34 and a spring 35 serve to keep the access cable taut so that its inner conductor remains rectilinear despite the relative variations in length to which it may be subject during moulding due to temperature variations. These variations are also minimized by the grooves provided in the mould which perform as heat resistances. The spring 35 is recessed in a bore in the end of a cylindrical part 36 engaged in the end of the internal passage of the mould. The clamp 31 is provided with bores 37A, 37B for two clamping screws to pass through.

The method of connecting a line cable to a repeater which has just been described applies more particularly to the case where the braiding which forms the sheathing of the access cable is made of aluminium and it can be applied without modification to the case where the return path of the line cable is formed by an aluminium tape laminated with a layer of polyethylene. In the case where the braiding of the access cable is made of copper, it is preferable to stop moulding the sheath at a point before the point of contact between the braiding and the aluminium flared tube and to cover this zone of contact between two different metals with a cap or "nipple" filled with polyisobutylene which opposes the ingress of moisture in the event that the outer conductor of the cable should come into contact with sea water subsequent to damage which affects the cable in the neighbourhood of a repeater.

I claim:

1. A sealed connection between an undersea coaxial line cable and a length of coaxial access cable connected to a repeater; the line cable comprising, in a radially outward direction, in order, an axial conductor, insulation, a return path conductor and an outer insulation sheath; the access cable comprising, in a radially outward direction, in order, an axial conductor, insulation, metal braiding forming a return path conductor, and an outer insulation sheath; and the connection comprising a conical conductive metal connection part for interconnecting the axial conductors, a surface moulded layer of insulating thermoplastic material, conductive connection means for interconnecting the return path conductors of the line cable and the access cable, and means for reconstituting the insulation sheathing between the line cable and the access cable, the improvement wherein said conductive connection means for interconnecting the return path conductors comprises an aluminum flared tube fitted tightly over the surface-moulded insulation, with a layer of graft polyolefin or adhesive ionomer tape wound helically around the surface moulding and being sandwiched in between the moulding and the flared tube, the wider end of the flared tube having a flared rim receiving and being welded to the return path conductor of the line cable, and the narrower end of the flared tube being glued with conductive adhesive to the metal braiding of the access cable.

2. A connection according to claim 1, wherein the means for reconstituting the sheathing between the sheaths of the line cable and the access cable are constituted by a surface moulding made of thermoplastic material which is injected hot.

3. A method of manufacturing a sealed connection between an undersea coaxial line cable and a length of coaxial access cable connected to a repeater, said line cable comprising, in a radially outward direction, in order, an axial conductor, insulation, a return path conductor and an outer insulation sheath; said coaxial access cable comprising, in a radially outward direction, in order, an axial conductor, insulation, metal braiding forming a return path conductor, and an outer insulation sheath; and wherein said method comprises the steps of:

(a) removing the insulation of the line cable and that of the access cable from the zone required for connection by cutting them obliquely;
(b) rolling back the end of the metal braiding which forms the return path conductor of the access cable towards the repeater;
(c) brazing the axial conductor of the access cable to a small end of a conical conductive metal connection part and the axial conductor of the line cable to the large end of the conical conductive metal connection part;
(d) surface molding a layer of insulating thermoplastic material over the conical connection part and extending between the insulation of the access cable and the line cable;
(e) helically winding at least one graft polyolefin or adhesive ionomer tape around said layer of insulating thermoplastic material;
(f) fitting a conductive aluminum flared tube having a flared rim at its larger end over said layer which is surrounded by said tape;
(g) welding said flared rim onto the end of the return path conductor of the line cable;
(h) turning down the end of the metal braiding forming the return path conductor of the access cable over the smaller end of the flared tube and gluing it thereon with a conductive adhesive; and of
(i) surface-molding a sheath over at least the end of said flared tube nearest the line cable, said surface moulding being performed at a sufficiently high temperature to melt the graft polyolefin or adhesive ionomer tape to thereby complete the connection between said sheath of the line cable and the sheath of the access cable.

4. A method according to claim 3, wherein the sheath of the line cable is connected to the sheath of the access cable entirely by surface moulding.

* * * * *